United States Patent [19]

Dunn et al.

[11] Patent Number: 4,615,720
[45] Date of Patent: Oct. 7, 1986

[54] METHOD AND APPARATUS FOR MELTING GLASS

[75] Inventors: Charles S. Dunn, Pataskala; Eugene C. Varrasso, Heath, both of Ohio

[73] Assignee: Owens-Corning Fiberglas Corporation, Toledo, Ohio

[21] Appl. No.: 742,819

[22] Filed: Jun. 10, 1985

Related U.S. Application Data

[63] Continuation of Ser. No. 552,636, Nov. 17, 1983, abandoned.

[51] Int. Cl.⁴ .................................................. C03B 5/24
[52] U.S. Cl. .................................... 65/29; 65/134; 65/161; 65/335; 414/148; 414/161
[58] Field of Search ................... 414/148, 161, 175; 65/1, 2, 29, 134, 161, 335

[56] References Cited

U.S. PATENT DOCUMENTS 3,469,962 9/1969 Owen .......................................... 65/29
4,312,658 1/1982 Mayer ........................................ 65/29

FOREIGN PATENT DOCUMENTS 923972 4/1962 United Kingdom ................... 65/335
0700471 12/1979 U.S.S.R. ................................. 65/335

Primary Examiner—Robert Lindsay, Jr.
Attorney, Agent, or Firm—Ronald C. Hudgens; Patrick P. Pacella

[57] ABSTRACT

This invention proposes a method of controlling the melting rate of a glass furnace to obtain substantially constant molten glass throughput. The furnace contains a pool of molten glass and a relatively thin layer of unmelted glass batch on the surface of the pool. The furnace contents are weighed, and the batch feed is controlled by the measured weight. In essence, the melting rate is determined by the thickness of the lighter, thermally insulated batch layer, since a thinner batch layer results in more heat loss through the batch and less batch melted by the cooler molten glass. Thus, a decrease in weight indicates more molten glass withdrawal and a lower melting rate, and batch is added to increase the molten glass temperature and to melt more glass batch. In the preferred embodiment, the furnace is electrically heated at a constant rate, and only the rate of batch feed is controlled to maintain substantially constant glass throughput.

7 Claims, 2 Drawing Figures

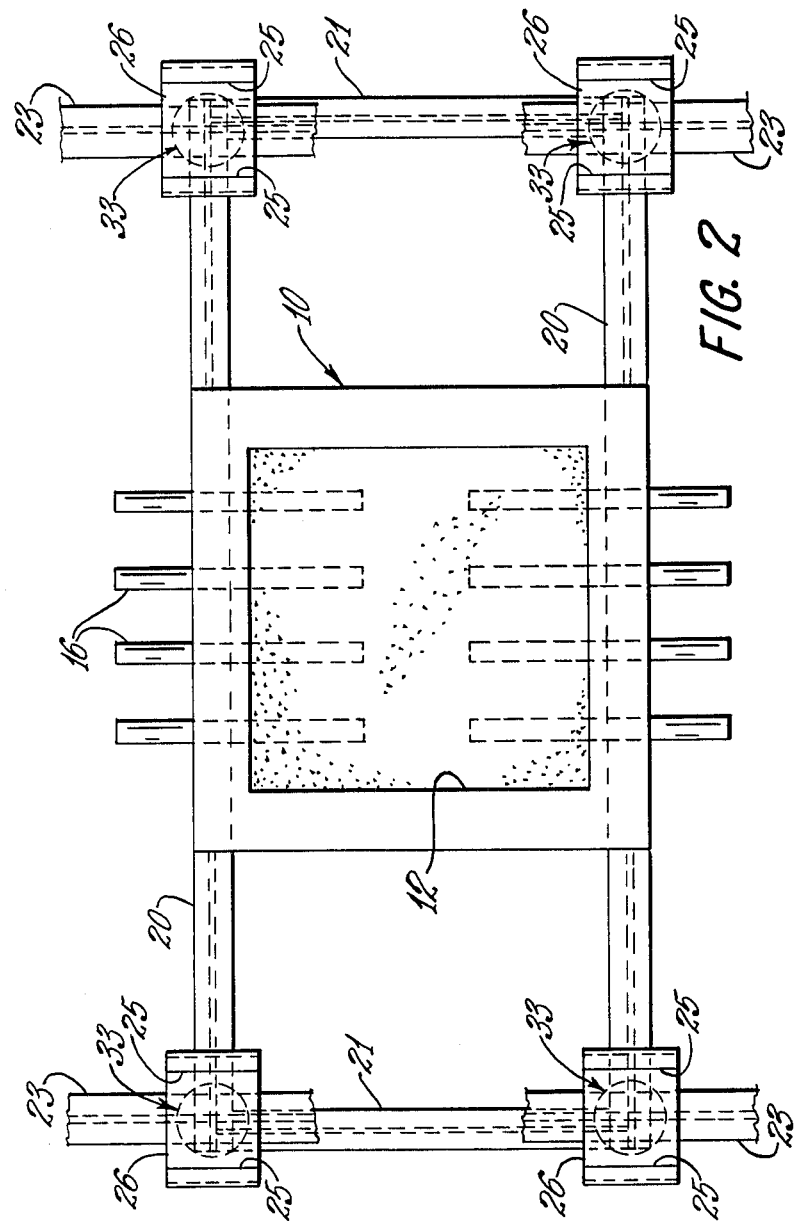

METHOD AND APPARATUS FOR MELTING GLASS

This is a continuation of application Ser. No. 552,636, filed Nov. 17, 1983, abandoned.

BACKGROUND OF THE INVENTION

In conventional electric glass melting furnaces, a pool of molten glass is heated by side or bottom entering electrodes to melt particulate glass batch present as a thick layer on top of the molten glass pool. The undersurface of the batch layer or blanket is melted by its contact with the molten pool as additional unmelted batch is added to the top of the batch blanket. The batch blanket typically is at least about 2 to 3 inches thick and serves to insulate the top of the molten pool from the ambient atmosphere.

The melting rate of a conventional electric melting furnace generally has been controlled by varying the amount of heating current to the electrodes in accordance with the level of molten glass in the furnace or forehearth, thus varying the temperature of the molten glass pool beneath the batch blanket. The glass level, i.e., the location of the top of the molten glass pool, will fluctuate in accordance with variations in the temperature of the molten glass pool, since hotter glass will melt more glass from the batch blanket to raise the glass level.

In some instances, such as in direct melt fiberglass melting furnaces where the furnace output is directly connected to the fiber-forming bushing, the throughput of the furnace and the hydrostatic or glass head over the bushing must be maintained substantially constant in order to prevent undesirable fluctuations in the fiber-forming operation, e.g., variations in the fiber diameter and the yardage produced. To maintain the throughput substantially constant, the depth of the molten glass pool must be maintained constant, and various forms of glass level controls have been utilized. Infrared detectors, ultrasonic detectors, glass level probes and other level detecting mechanisms have been tried, but accurate glass level detection and control is rendered difficult by the presence of the relatively light, thermal insulating, particulate glass batch blanket on top of the molten glass pool. Other difficulties have arisen from the attempted correlation of level control with the glass temperature control by varying the current supply to the electrodes.

As a result, the prior art has not provided a satisfactory means for maintaining substantially constant molten glass throughput from a glass melting furnace.

BRIEF DESCRIPTION OF THE PRESENT INVENTION

The present invention now proposes an extremely simple yet effective method of controlling the melting rate of a glass furnace to obtain substantially constant molten glass throughput. The method and apparatus of this invention provides a substantially constant depth pool of molten glass by controlling only one variable, namely the rate of feeding particulate glass batch onto the top of the molten glass pool. An extremely thin layer of glass batch, generally less than about 1 inch in depth and preferably from about ⅛ to about ½ inch in depth, is maintained on top of the molten glass pool, and the melting rate of the furnace is controlled by the thickness of the batch layer. The molten glass temperature and the melting rate are less when the batch thickness is less since there is more heat loss through the thin batch layer. Conversely, the glass temperature and the melting rate increases with a relatively thicker insulating batch layer, since less heat is lost to the atmosphere through the batch layer.

The thickness of the batch layer is controlled by varying the rate of batch feed onto the surface of the molten glass pool in accordance with the amount of molten glass in the pool. The amount of glass in the pool is determined by weighing the furnace and its contents, determining any deviation in the weight of the furnace and its contents from a nominal weight corresponding to a desired molten glass level and adjusting the feed of particulate glass batch in accordance with any determined deviation. The batch feeder simply spread up or slows down in response to throughput changes because of the weight changes which occur when the furnace output rate does not equal the batch input rate.

The furnace has melting rate stability due to the thermodynamics of the system. The heat input rate, i.e., the power supplied to the electrodes, is set at a constant value sufficient to melt glass at the desired rate and to supply thermodynamic losses. The initial input heat rate, i.e., the power supplied to the electrodes, must be carefully selected. Too much heat input will result in no batch cover at low throughputs, while too little heat input will cause the batch cover to become very thick.

Any increase in throughput requires the melting of more batch. This is accomplished in a self-controlled fashion, i.e., the resultant weight loss of the furnace and contents adds more batch, and the increase in batch thickness reduces the heat loss through the batch, thereby increasing the rate of melting of the batch layer, since more electrical melting heat is available. Conversely, a decrease in throughput increases the weight, reduces the rate of batch feed, causes more heat radiation loss through the thinner batch crust and reduces the rate of melting of the batch.

The resultant thermal stability of the furnace, so long as the proper input heat rate is selected, is self-controlling, and there is little tendency to disturb the thermal equilibrium. Heat losses are automatically reduced at high throughputs by the thick batch cover and are automatically increased at low throughputs so that the proper amount of heat is always available for melting the batch. Obviously, the thermal efficiency of the furnace varies with throughput, the efficiency being better at higher throughputs.

The depth of glass in the furnace, the glass head over the bushing, the glass throughput and the yardage produced are all maintained substantially constant by weighing the entire furnace and its contents and adjusting the melting rate of the furnace by reducing or increasing the heat losses through the batch layer simply by increasing or decreasing the depth of the batch layer itself. Consequently, there is no need for any determination of the level of molten glass in the furnace; there is no need for increasing or decreasing the power input into the furnace heating electrodes; and there is no need for any correlation between a glass depth measurement and a variance of the power input to the electrodes.

BRIEF DESCRIPTION OF THE DRAWINGS

FIG. 2 is a plan view of the furnace of FIG. 1.

DETAILED DESCRIPTION OF THE PREFERRED EMBODIMENT

Figure 1:
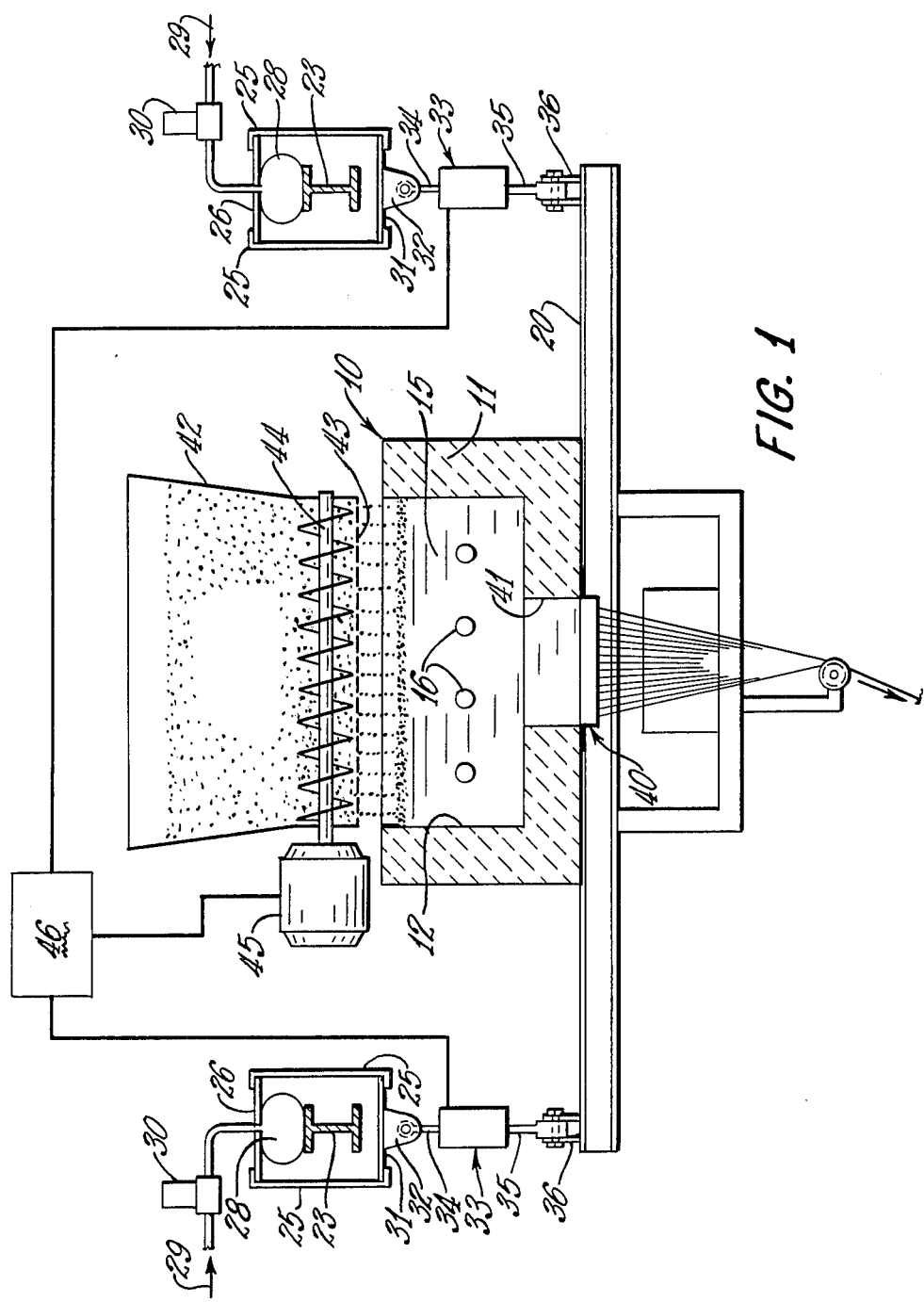
FIG. 1 is a schematic representation of a furnace provided with the apparatus of the present invention and capable of carrying out the method of the present invention.

In that embodiment of the invention illustrated in FIGS. 1 and 2, reference numeral 10 refers generally to a furnace which is schematically represented. It will, of course, be understood that the furnace 10 includes a supporting framework (not shown) for a refractory lining 11 enclosing an open-topped interior space 12 within which is confined a pool of molten glass 15.

The pool of molten glass 15 is heated by a plurality of electrodes 16 entering through the furnace side walls and lying in a common horizontal plane. The electrodes 16 are preferably heated at a constant rate from a desired electrical source by an appropriate heating circuitry. Preferably, the electrodes are energized in the manner illustrated and described in the pending application of Eugene C. Varrasso, Ser. No. 342,856, filed in the U.S. Patent and Trademark Office on Jan. 26, 1982, and assigned to the assignee of the present invention.

As best illustrated in FIG. 2 of the drawings, the furnace 10 is supported on a pair of parallel, longitudinal beams 20 joined by transverse beams 21. The intersecting beams 20 and 21 are suspended from structural supports 23 which are fixed in position as a part of the building structure. The structural supports 23 are each surrounded by a suspension cage 25, and each suspension cage has an upper plate 26 contacting the upper extremity of an airbag 28 interposed between the plate 26 and the structural support 23. Each airbag 28 is inflated by air from a source 29 under a constant pressure controlled by pressure control valve 30. Each cage 25 also has a lower plate 31 having a depending clevis 32 joined to a load cell 33 by a rod 34. The lower extremity of the load cell 33 is connected through a second rod 35 to a lower clevis 36 to the intersection of the beams 20 and 21. It will be seen from FIG. 2 that four load cells 33, cages 25 and bags 28 are provided. The purpose of the bags 28 is to isolate the beams 20 and 21 and the load cells 33 from any extraneous vibrations which might occur within the building structural elements 23. The system illustrated utilizes four load cells 33, but three load cells may be used.

The load cells 33 are generally commercially available from Orbitran Corporation, 8400 Magnolia Avenue, Santee, Calif., in various sizes and configurations. In one preferred embodiment of the present invention, the total weight of the furnace 10 and the furnace contents was about 5,000 pounds, and three Orbitran load cells, each having a capacity of 5,000 pounds, were utilized. The airbags 28 are commercially available from Goodyear Air Spring Company of Akron, Ohio and in the preferred embodiment, three Goodyear Air Spring Model No. 188-150 airbags, each having a capacity of 500 to 2,500 pounds, were utilized.

It will be appreciated that the load cells 33, in effect, weigh the furnace 10 and the furnace appendages and contents including the body of molten glass 15 interiorally of the furnace, a fiberglass bushing 40 communicating with the body of molten glass through outlet passage 41 and any glass batch present on the surface of the body of molten glass 15 is hereinafter described.

Positioned above the furnace 10 in registry with the open top of the furnace is a hopper 42 containing particulate glass batch, this hopper having a perforate bottom wall 43 through which particulate glass batch passes from the hopper onto the surface of the molten glass body 15 retained in the furnace 10. A glass batch feeding mechanism is provided, including a helical feed screw 44 driven by a variable speed, direct current motor 45. The variable speed motor 45 is controlled by a microprocessor 46 receiving weight indications from the load cells 33 and transmitting speed control indications to the motor 45. Microprocessor 46 preferably is a DM7 microprocessor available from Orbitran Corporation, above identified. The signals from the load cells 33 are added, and a 4-20MA signal corresponding to the total melter and contents weight is generated by the microprocessor 46. This 4-20MA signal is then fed into an ECS proportional controller to control the batch feed weight by varying the speed of the feed motor 45.

As the motor 45 receives its speed instructions from the microprocessor 46, the motor either speeds up or slows down to deliver more or less batch from the hopper 42 to the surface of the molten glass pool 15. The particulate batch is an insulator, so the amount of heat loss upwardly from the pool 15 through the layer of glass batch is dependent upon the thickness of the batch layer. The thicker the batch, the less heat loss and the hotter the molten glass in the pool 15. The melting rate of the batch is, of course, dependent upon the glass temperature, and more batch is melted more quickly from the undersurface of a thick batch blanket than from a thin batch blanket.

Thus, when the level of the molten glass pool drops, so long as the glass is heated at a constant rate, it is because the glass has lost more heat through a thin batch layer. The remedy is to increase the batch feed rate to increase the batch blanket thickness and to increase the melting rate. The melting rate effect is quite pronounced where a thin batch layer is utilized, and large relative thickness variations can be quickly made, for example, by quadrupling the blanket thickness from $\frac{1}{8}$ inch to $\frac{1}{2}$ inch.

The weight of the furnace 10, the bushings 40 and the support beams 21, 21 remains constant and may be treated as tare weight. The particulate batch has a density of about 55 pounds per cubic foot, about $\frac{1}{3}$ of the density of the molten glass (165 pounds per cubic foot). Since the batch layer has a thickness of less than about 1 inch, and preferably of from about $\frac{1}{8}$ inch to about $\frac{1}{2}$ inch, while the molten glass depth over the bushing is about 14 inches, the weight of the thin batch layer is a minimal factor.

Thus, any difference in weight determined by the load cells 33 in operation is an accurate reflection of a corresponding fluctuation in the depth of the molten glass pool. The determination of any depth variation in the pool 15 and the immediate correction of any such variation is of extreme importance in maintaining proper operation of the bushing 40, as by preventing any variation in fiber diameter. Also, the maintenace of molten glass body depth prevents stone formation in the glass and ensures the delivery to the bushing of molten glass of constant temperature and of uniform thermal history.

Assuming that the furnace 10 is delivering molten glass to the bushing 40 at a nominal head of 14 inches, with constant power to the set of electrodes 16, at a nominal bushing delivery temperature, the batch blanket has a nominal thickness of about $\frac{3}{8}$ inches, and the total weight of the furnace, the furnace contents and appendages was 5,000 pounds. If the level of glass dropped, due to a lower melting rate because of increased heat loss through the batch blanket, the measured weight would decrease. The load cells 33 would detect the weight decrease and transmit the appropriate signal to the microprocessor 46. The microprocessor would increase the speed of the variable speed motor 45 to feed additional batch to the furnace, increasing the batch blanket thickness. The lower heat loss through the thicker blanket causes the temperature of the molten glass to rise, increasing the melting rate and raising the level of the molten glass pool. The consequent increase in weight will again be detected by the load cells and transmitted to the microprocessor and to the motor 45 so that the motor speed will decrease to decrease the rate of batch feed.

The detection of glass level fluctuations is quite sensitive, and the system routinely controlled the melter weight to plus or minus two pounds in a melter which was 18 inches wide by 30 inches long and where the total furnace weight was about 5,000 pounds. This control of the total melter weight corresponds to a control of the molten glass level within plus or minus 0.04 inches. The utilization of the microprocessor control for the direct current variable speed motor accommodates virtually continuous adjustments of the motor speed and batch feed rate to ensure the desired melting rate and the requisite substantially constant throughput.

Since the apparatus controls the glass level and ultimately the throughput by varying the heat losses through the batch blanket and the batch blanket or crust is quite thin compared to those of the prior art, the heat losses from the molten pool through the blanket are somewhat larger than those from conventional furnace operation. However, such heat losses are only about 5–10% greater than those of a conventional furnace. This means that from 5–10% more electrical power to the electrodes is required as compared to a conventional electrical melting furnace. The advantages of the present furnace and process will justify such minor increases in power requirements.

We claim:

1. In a method of melting glass in a glass melting furnace, the steps of:
    (a) forming a molten glass pool in said furnace beneath a layer of particulate unmelted glass batch on the surface of the pool;
    (b) heating the molten glass pool at a constant nominal heating rate;
    (c) weighing the furnace and its contents including the pool and the batch layer; and
    (d) varying the thickness of the batch layer within a range of from about ⅛ inch to about 1 inch as a function of the weight determined in step (c) to vary the batch melting rate, thereby maintaining a substantially constant molten glass level.

2. A method of operating a glass melting furnace containing a molten glass body comprising heating said body at a constant nominal heating rate while:
    (a) constantly supplying particulate glass batch to said molten glass body to maintan a discrete layer of unmelted batch on the surface thereof;
    (b) constantly weighing the furnace and its contents;
    (c) varying the rate at which glass batch is added to the batch layer in accordance with the weight of the furnace and its contents to correspondingly vary the batch layer thickness; and
    (d) utilizing the heat losses from the molten glass body through the batch layer, these heat losses being inversely proportional to the thickness of the batch layer, to vary (1) the actual heating rate of the glass body and (2) the amount of glass batch that is melted, thereby maintaining a substantially constant level of molten glass in said glass body.

3. The method of controlling the level of molten glass in a glass melting furnace, comprising the steps of:
    (a) heating a body of molten glass in said furnace at a substantially constant nominal heating rate;
    (b) feeding particulate glass batch onto the surface of the glass body at a variable rate determined by the amount of molten glass in the body;
    (c) while maintaining the glass batch layer at a minimal thickness to ensure substantial heat loss through the batch layer; and
    (d) varying the actual heating rate in the glass body by the thickness of the batch layer, the heating rate increasing with increased batch thickness to melt more batch and to raise the molten glass level in the furnace.

4. The method as defined in claim 3, wherein the step (b) is carried out by weighing the furnace and its contents.

5. The method as defined in claim 3, wherein the glass batch layer is from about ⅛ inch to about 1 inch thick.

6. In a method of operating a glass melting furnace, the steps of:
    (1) constantly heating a body of molten glass in said furnace at a nominal heating rate;
    (2) constantly weighing the furnace and its contents; and
    (3) constantly feeding particulate glass batch onto the surface of the molten glass at a rate:
        (a) that varies the batch thickness according to the weight of the furnace and its contents; and
        (b) that maintains a substantially constant molten glass level by changing the actual furnace melting rate according to variations in the heat losses from the molten glass through the variable thickness batch layer.

7. In a method of operating a glass melting furnace for supplying molten glass to a fiberizing bushing or the like apparatus requiring a substantially constant supply of molten glass, the steps of:
    (1) heating a body of molten glass in said furnace at a constant nominal rate;
    (2) depositing particulate glass batch on the surface of the molten glass at a nominal rate calculated to supply sufficient glass to the furnace and to provide a batch layer of from about ⅛ inch to about 1 inch in thickness;
    (3) constantly weighing the furnace and its contents;
    (4) in the event that the performance of step (3) indicates less weight than that corresponding to the desired amount of glass in the furnace, increasing the rate of the batch deposition (a) to reduce heat losses through the batch layer, (b) to increase the effective heating rate of the glass body, and (c) to increase the rate of batch melting, thereby raising the level of molten glass; and
    (5) in the event that the performance of step (3) indicates a greater weight than that corresponding to the desired amount of glass in the furnace, decreasing the rate of batch deposition (a) to increase heat losses through the batch layer, (b) to reduce the effective heating rate of the glass body and (c) to reduce the rate of batch melting, thereby lowering the level of molten glass.

* * * * *